July 14, 1942.   J. W. COX   2,289,486
FACSIMILE AND PHOTO SIGNALING SYSTEM
Filed Sept. 28, 1940
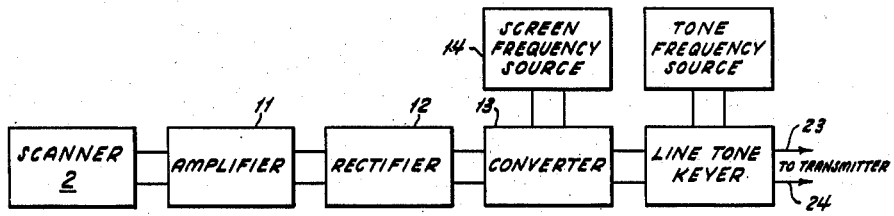
Fig. 1
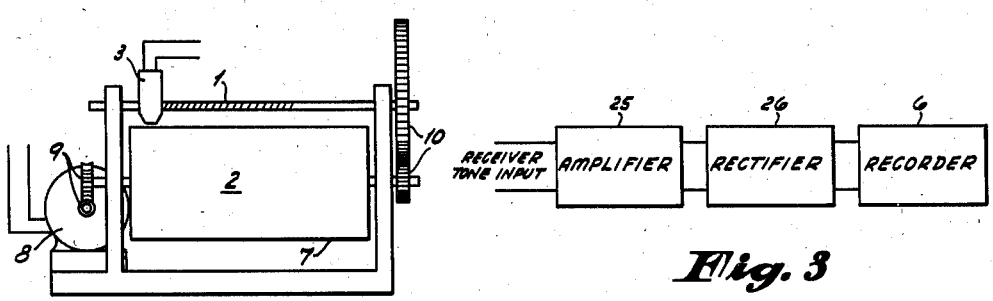
Fig. 2
Fig. 3
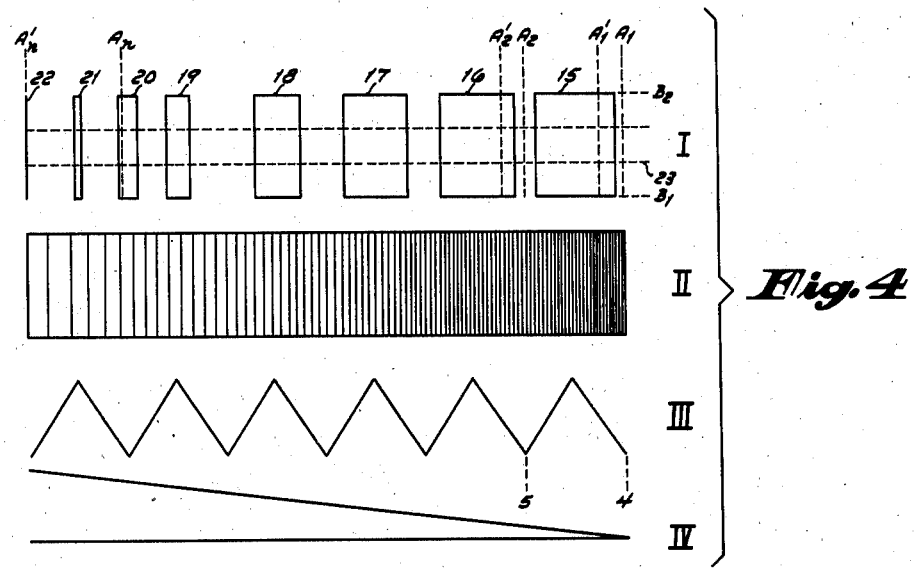
Fig. 4
INVENTOR.
JOHN W. COX
BY
ATTORNEY

UNITED STATES PATENT OFFICE 2,289,486

FACSIMILE AND PHOTO SIGNALING SYSTEM

John W. Cox, Berkeley, Calif., assignor to Radio Corporation of America, a corporation of Delaware Application September 28, 1940, Serial No. 358,807

4 Claims. (Cl. 178—6.7)

This invention relates to the transmission and recording of facsimile and photo signals.

One object of the invention is to increase the speed of analyzing and recording of the signal pulses by making the length of the lens field of the scanner and recorder equal to the longest possible dot signal pulse.

Another object is to make the length and breadth of the lens field equal to the longest possible dot signal and co-ordinate the axial travel of the lens therewith.

Other objects of the invention will appear in the following description, reference being had to the drawing, in which:

Fig. 1 is a block diagram of the transmitting system.

Fig. 2 is a conventional illustration of the scanning device.

Fig. 3 is a block diagram of the recording system.

Fig. 4 illustrates the relation between the screen frequency, the shading of the subject, the lens field area and the length of the dot signal pulses.

While this invention is not limited thereto, it will be described in connection with the constant frequency variable dot system described in the patent to Henry Shore and James N. Whitaker, No. 2,083,245, granted January 8, 1937. The electrical circuit of that system is fully illustrated and described in the said patent and it will be unnecessary to repeat it herein. Since the CFVD system is well known in the art, it will be sufficient to use block diagrams and to explain such system only in a general way.

While the CFVD system is not limited to any particular drum speed, axial travel of the pick-up element along said drum and definite screen frequency, the average drum speed is twenty revolutions per minute and the axial travel of the pick-up, or line advance, is $\frac{1}{120}$ of an inch. The breadth of the lens field in this prior art system is, of course, made equal to the line advance, i. e., axial travel, and the length is made as small as possible so as to produce minimum overlap of the dots and the spaces between them. By breadth, or width, is meant the dimension of the field axially of the drum or equivalent, and by length is meant the dimension circumferentially of the drum or equivalent. There is, therefore, no co-ordinating of either the field length or its breadth with the screen frequency or maximum dot length. In this improvement I produce this by making the pitch of the pick-up screw 1 in the scanner 2 of such value that the pick-up 3 has a line advance exactly equal to the maximum dot length. The breadth and length of the pick-up lens are also made exactly equal to the maximum dot length. The width of the lens field is the distance between the lines $B_1$, $B_2$ in graph I of Fig. 4 and the length of the field is the distance between the lines $A_1$ and $A_2$. These dimensions are, of course, greatly enlarged. It will be seen that this is the same as the distance between the points 4 and 5 of the screen frequency of graph III. This distance $A_1$, $A_2$ is also the travel of the drum during one cycle of the screen frequency.

The relation of the field of the lens to the line advance in the scanner 2 applies also to the recording device 6 in Fig. 3. The two units would be identical except that the pick-up 3 at the transmitter would be displaced by the light source or other recording medium in the recorder.

It will be understood that the drum 7 is driven by a constant speed device such as a synchronous motor 8 through worm gearing 9, or equivalent, and that the drum drives the pick-up screw 1 through suitable gearing 10. While it isn't a requirement, I find it preferable to increase the line advance or axial travel from the $\frac{1}{120}$ of an inch above refered to, to $\frac{1}{40}$ of an inch. This, as already explained, is the length and breadth of the pick-up field. As an example of the circumferential scanning speed, I will say that it may be approximately 3.073 inches per second, which is the usual scanning speed of the CFVD system disclosed in the aforesaid Shore and Whitaker patent, although it may have any desired value. The time required to relatively move the pick-up a circumferential distance equal to its own field length will be $\frac{1}{40}$ divided by 3.073, or 1/122.93 seconds. Since the principles of my invention require that the maximum dot length be equal to the pick-up field length, the value 1/122.93 is the periodic time T of the screen frequency. The screen frequency therefore must be equal to 1/T which is 122.93 cycles per second. This gives a maximum dot length of $\frac{1}{40}$ of an inch. Another way of stating this is that the circumferential scanning speed is equal to the screen frequency multiplied by the field length of the pick-up.

With the drum speed, the line advance and the lens field thus co-ordinated, a variable amplitude output as shown in graph IV of Fig. 4 is produced in scanning the subject of graph II. This is amplified by one or more amplifiers, shown in the block diagram 11, rectified at 12 and fed into converter 13, where the screen frequency 14 reacts with the amplitude variation IV to produce constant frequency variable dot pulses, as fully described in the afore-mentioned Shore and Whitaker patent. The lengths of these dots are given by the horizontal lines 15 to 22, inclusive, line 22 having minute length.

The breadth of the picture element picked off by the usual CFVD system of the prior art, though this of course may vary in practice, would be shown between the dotted lines B1 and the dotted line 23. The breadth of this picture element in my improvement will therefore be three times this, or the distance between the lines B1 and B2. This is the breadth of the lens field.

The output terminals 23, 24 containing the CFVD dot signals are connected to the radio transmitter or to land lines, as the case may be. If the transmission is over the ether by radio waves, it will be received, amplified, detected and given a tone frequency for transmission to the local office, if the distance warrants it. The apparatus for doing this is old and well known in the art and since no particular form of this apparatus is required for my invention, it is not illustrative.

The tone frequency input from the receiver is passed to the amplifier 25 and sufficiently amplified, after which it is passed into rectifier 26 and thence into recorder 6, which may be of any type. The signal pulses applied to the recorder will have the time length of the variable dots 15 to 22, inclusive, but the lens field, as previously explained, has a length and breadth equal to the longest possible dot, which is the distance between 4 and 5 in graph III and between A1 and A2 in graph I. The dots 15 to 22, inclusive, will not be reproduced by the recorder with the variable spaces therebetween. Since the field of this lens has the length A1, A2, it will spread the record over a distance equal to the maximum dot length and it also will record an average shading from all of the dots and spaces as the lens field travels relative to the recording surface. This will be apparent from the position of the subsequent field position A'1, A'2. That is, this relatively traveling field of light having a breadth of B1, B2 and a length of A1, A2, will produce the gradual shading of the original subject, instead of the half-tone effect produced by the prior art CFVD system. Graph II of Fig. 4 therefore represents the recorded surface, as well as the subject surface at the transmitter.

It will thus be seen that by my improvement I convert CFVD, or other half-tone signals, into full-tone records, which produces a more suitable and pleasing record. This is accomplished at a greater speed—in the example given, at three times the speed.

The scanner and recorder drums, of course, should travel at proportional speeds and be maintained in phase with each other, as well as properly framed. Devices for doing this are old and well known in the art and they have been omitted from the drawing.

The means for holding the subject to be scanned need not be a drum. It may be a flat disc rotating relative to the pick-up; also various other equivalents of the drum may be used.

My invention is not to be limited to the apparatus disclosed or to the values given, as it is of general application.

Having described my invention, what I claim is:

1. In constant frequency variable dot signal systems, means for positioning the subject to be scanned, means for converting light values of the subject into a voltage of varying amplitude including a pick-up, a source of alternating screen voltage having a constant frequency, a converter acting with the screen voltage to convert the first-mentioned voltage into pulses having said frequency and a varying time length, and means for moving the pick-up relative to the subject at a speed equal to the screen frequency multiplied by the pickup field length.

2. In constant frequency variable dot signal systems, means for holding the subject to be scanned, means for translating light values of the subject into a voltage of varying amplitude including a pick-up, a source of alternating screen voltage having a constant frequency, a converter acting with the screen voltage to convert the first-mentioned voltage into pulses having said frequency and a varying time length, and means for moving the pick-up relative to said means at a speed equal to the screen frequency multiplied by the pick-up field length.

3. In constant frequency variable dot signal systems, means for holding the subject to be scanned, means for translating light values to voltage values including a pick-up, a source of alternating screen voltage having a constant frequency, a converter acting with the screen voltage to convert said voltage values into pulses having said frequency and a varying time length, means for moving the pick-up relative to said means at a speed equal to the screen frequency multiplied by the pick-up field length, a recorder drum, a scanner for translating the dot pulses into a visible record, and means for moving the scanner relative to the drum at a speed equal to the dot frequency multiplied by the field length of the scanner.

4. In signal reception, means for receiving constant frequency variable dot signals, a recorder drum, means for translating the dot pulses into a visible record including a scanner, and means for moving the scanner relative to the drum at a speed equal to the dot frequency multiplied by the field length of the scanner.

JOHN W. COX.